United States Patent
Kimura et al.

(10) Patent No.: US 6,433,865 B1
(45) Date of Patent: Aug. 13, 2002

(54) APPARATUS AND METHOD FOR MEASURING OPTICAL CHARACTERISTICS AND RECORDING MEDIUM

(75) Inventors: Eiji Kimura; Motoki Imamura; Toshio Kawazawa; Satoru Nagumo, all of Tokyo (JP)

(73) Assignees: Advantest Corporation; KDD Submarine Cable Systems, Inc., both of Tokyo (JP)

( * ) Notice: Subject to any disclaimer, the term of this patent is extended or adjusted under 35 U.S.C. 154(b) by 0 days.

(21) Appl. No.: 09/975,557

(22) Filed: Oct. 12, 2001

(30) Foreign Application Priority Data

Oct. 13, 2000 (JP) ........................................ 2000-313392

(51) Int. Cl.[7] .............................................. G01N 21/00
(52) U.S. Cl. ..................................................... 356/73.1
(58) Field of Search ......................... 356/73.1; 359/110, 359/109–195; 250/214 R, 214 C, 227.12, 227.24

(56) References Cited

U.S. PATENT DOCUMENTS 4,551,019 A * 11/1985 Vella et al. .................. 356/73.1
5,406,368 A * 4/1995 Horiuchi et al. ............ 356/73.1
5,432,602 A * 7/1995 Sharma et al. .............. 356/326

* cited by examiner

*Primary Examiner*—Frank G. Font
*Assistant Examiner*—Tu T Nguyen
(74) *Attorney, Agent, or Firm*—Lowe Hauptman Gilman & Berner, LLP

(57) ABSTRACT

To provide an apparatus for measuring chromatic dispersion when modulating frequency of a variable wavelength light source is different from modulating frequency of a fixed wavelength light source for reference.

This apparatus is provided with a variable wavelength light phase comparator 24 for obtaining a phase difference $\phi x - \phi x'$ between a variable wavelength light component and a signal having the first modulating frequency fmx, a fixed wavelength light phase comparator 25 for obtaining a phase difference between a phase difference $\phi 0 - \phi 0'$ between a fixed wavelength light component and an electrical signal having the second modulating frequency fm0, a phase difference converter 26 for converting the phase difference $\phi 0 - \phi 0'$ calculated by the fixed wavelength light phase comparator 25 into $\phi ex$, which corresponds to the first modulating frequency fmx, and a true phase difference calculator 27 for measuring a true phase difference $\phi$ between the phase difference $\phi x - \phi x'$ calculated by the variable wavelength light phase comparator 24, and the converted result $\phi ex$ of phase difference converter 26, and obtains the true phase difference $\phi$ from which an affect of contraction/extension of a DUT 30 is removed when the first modulating frequency fmx and the second modulating frequency fm0 are different, thereby measuring wave dispersion.

5 Claims, 4 Drawing Sheets

*FIG. 2(c)* $\quad \phi_{ex} = \dfrac{f_{mx}}{f_{m0}} \cdot \phi_{e0}$

APPARATUS AND METHOD FOR MEASURING OPTICAL CHARACTERISTICS AND RECORDING MEDIUM

BACKGROUND OF THE INVENTION

1. Field of the Invention

The present invention relates to measuring chromatic dispersion characteristic of a DUT (Device Under Test) such as an optical fiber, and more specifically relates to technology for measuring without being influenced by a contraction/extension of the DUT.

2. Description of the Related Art

When chromatic dispersion characteristic of a device under test (DUT) such as an optical fiber are measured, it is desirable to measure while eliminating the influence of a contraction/extension of the DUT. A technology for measuring without being influenced by the contraction/extension of the DUT is described in Publication of Japanese Patent Laid-Open No. H01-291141.

FIG. 4 shows a constitution of its measuring system. As described in FIG. 4, the measuring system is divided into a light source system 10 and a characteristics measuring system 20. A variable wavelength light source 12 in the light source system 10 changes a wavelength to generate light with a wavelength of $\lambda x$ (variable wavelength light). A fixed wavelength light source 13 fixes a wavelength to generate light with a wavelength of $\lambda 0$ (fixed wavelength light). $\lambda 0$ is a wavelength which provides the minimum chromatic dispersion in a DUT 30. The variable wavelength light and the fixed wavelength light are modulated with a frequency of f respectively by an optical modulator 15a, and an optical modulator 15b, and are composed by a multiplexer 16. The frequency f is provided by power supplies for modulating, which are omitted in the drawing.

Light composed in the multiplexer 16 enters into the DUT 30. The light transmitted through the DUT 30 enters an optical demultiplexer 21 of the characteristics measuring system 20. The optical demultiplexer 21 separates the transmitted light through the DUT 30 into light with the wavelength of $\lambda x$ and light with the wavelength of $\lambda 0$. An optical/electrical converter for measuring 22a and an optical/electrical converter for reference 22b respectively apply optical/electrical conversion to the light with the wavelength of $\lambda x$ and the light with the wavelength of $\lambda 0$, and a phase comparator 24 detects a phase difference between an output from the optical/electrical converter for measuring 22a and an output from the optical/electrical converter for reference 22b.

The transmitted light with the wavelength of $\lambda x$ is affected by the chromatic dispersion and the contraction/extension of DUT 30. The transmitted light with the wavelength of $\lambda 0$ is affected only by the contraction/extension of DUT 30. This is because $\lambda 0$ is the wavelength which provides the minimum chromatic dispersion in DUT 30. Thus, detecting the phase difference between the transmitted light with the wavelength of $\lambda x$ and the transmitted light with the wavelength of $\lambda 0$ removes the affect of contraction/extension of DUT 30.

SUMMARY OF INVENTION

However, it is required to provide the optical modulator 15a and the optical modulator 15b with the same frequency for modulating. In other words, it is impossible to set the frequency for modulating in the optical modulator 15a and the frequency for modulating in the optical modulator 15b different from each other.

A purpose of the present invention is to provide an apparatus and the like for measuring the chromatic dispersion when the modulating frequency for the variable wavelength light source and the modulating frequency for the fixed wavelength light source for reference are different.

According to the present invention as described in claim 1, an optical characteristics measuring apparatus for measuring characteristics of light transmitted thorough a device under test includes: a variable wavelength light source for generating variable wavelength light; a fixed wavelength light source for generating fixed wavelength light; a variable wavelength light modulating unit for receiving a signal having a first modulating frequency, and modulating the variable wavelength light with the first modulating frequency; a fixed wavelength light modulating unit for receiving a signal having a second modulating frequency, which is different from the first modulating frequency, and modulating the fixed wavelength light with the second modulating frequency; a composite light generating unit for entering composite light composed of the variable wavelength light and the fixed wavelength light into the device under test; a wavelength component extracting unit for extracting a fixed wavelength light component and a variable wavelength light component from transmitted light transmitted from the device under test; and a phase comparing unit for measuring a true phase difference between the variable wavelength light component having the first modulating frequency and the signal having the first modulating frequency based on the variable wavelength light component, the fixed wavelength light component, the signal having the first modulating frequency, and the signal having the second modulating frequency; wherein characteristics of the device under test is obtained from the true phase difference.

With the optical characteristics measuring apparatus constituted as described above, the phase difference between the phase of variable wavelength light component and the phase of signal having the first modulating frequency includes the affect of contraction/extension and the like of the device under test. On the other hand, the phase difference between the phase of fixed wavelength light component and the phase of signal having the second modulating frequency includes only the affect of contraction/extension and the like of the device under test. Thus, it is possible to remove the affect of contraction/extension and the like of the device under test from the phase difference between the phase of variable wavelength light component and the phase of signal having the first modulating frequency by taking into account of the phase difference between the phase of fixed wavelength light component and the phase of signal having the second modulating frequency. In other words, a true phase difference is measured. Also, the first modulating frequency may be different from the second modulating frequency.

The "true phase difference" here is a phase difference when the affect of contraction/extension of device under test is removed.

The present invention as described in claim 2, is the optical characteristics measuring apparatus as claimed in claim 1, wherein the phase comparing unit is provided with: a variable wavelength light phase comparing unit for obtaining a phase difference between the variable wavelength light component and the signal having the first modulating frequency; a fixed wavelength light phase comparing unit for obtaining a phase difference between the fixed wavelength light component and the signal having the second modulating frequency; a phase difference converting unit for converting the phase difference calculated by the fixed wavelength light phase comparing unit to what corresponding to the first modulating frequency; and a true phase difference calculating unit for calculating a true phase difference from the phase difference calculated by the variable wavelength light phase comparing unit and the converted result of the phase difference converting unit.

According to the present invention as described in claim 3, the optical characteristics measuring apparatus as claimed in claim 1 further includes a characteristics calculating unit for calculating group delay or chromatic dispersion of the device under test from the true phase difference.

According to the present invention as described in claim 4, an optical characteristics measuring method for measuring characteristics of light transmitted thorough a device under test includes: a variable wavelength light generating step for generating variable wavelength light; a fixed wavelength light generating step for generating fixed wavelength light; a variable wavelength light modulating step for receiving a signal having a first modulating frequency, and modulating the variable wavelength light with the first modulating frequency; a fixed wavelength light modulating step for receiving a signal having a second modulating frequency, which is different from the first modulating frequency, and modulating the fixed wavelength light with the second modulating frequency; a composite light generating step for entering composite light composed of the variable wavelength light and the fixed wavelength light into the device under test; a wavelength component extracting step for extracting a fixed wavelength light component and a variable wavelength light component from transmitted light transmitted from the device under test; and a phase comparing step for measuring a true phase difference between the variable wavelength light component having the first modulating frequency and the signal having the first modulating frequency based on the variable wavelength light component, the fixed wavelength light component, the signal having the first modulating frequency, and the signal having the second modulating frequency; wherein characteristics of the device under test is obtained from the true phase difference.

The present invention as described in claim 5, is a computer-readable medium having a program of instructions for execution by the computer to perform an optical characteristics measuring process for measuring characteristics of light transmitted thorough a device under test. The optical characteristics measuring process includes: a variable wavelength light generating processing for generating variable wavelength light; a fixed wavelength light generating processing for generating fixed wavelength light; a variable wavelength light modulating processing for receiving a signal having a first modulating frequency, and modulating the variable wavelength light with the first modulating frequency; a fixed wavelength light modulating processing for receiving a signal having a second modulating frequency, which is different from the first modulating frequency, and modulating the fixed wavelength light with the second modulating frequency; a composite light generating processing for entering composite light composed of the variable wavelength light and the fixed wavelength light into the device under test; a wavelength component extracting processing for extracting a fixed wavelength light component and a variable wavelength light component from transmitted light transmitted from the device under test; and a phase comparing processing for measuring a true phase difference between the variable wavelength light component having the first modulating frequency and the signal having the first modulating frequency based on the variable wavelength light component, the fixed wavelength light component, the signal having the first modulating frequency, and the signal having the second modulating frequency; wherein characteristics of the device under test is obtained from the true phase difference.

DESCRIPTION OF THE PREFERRED EMBODIMENTS

The following section describes an embodiment of the present invention referring to drawings.

Figure 1:
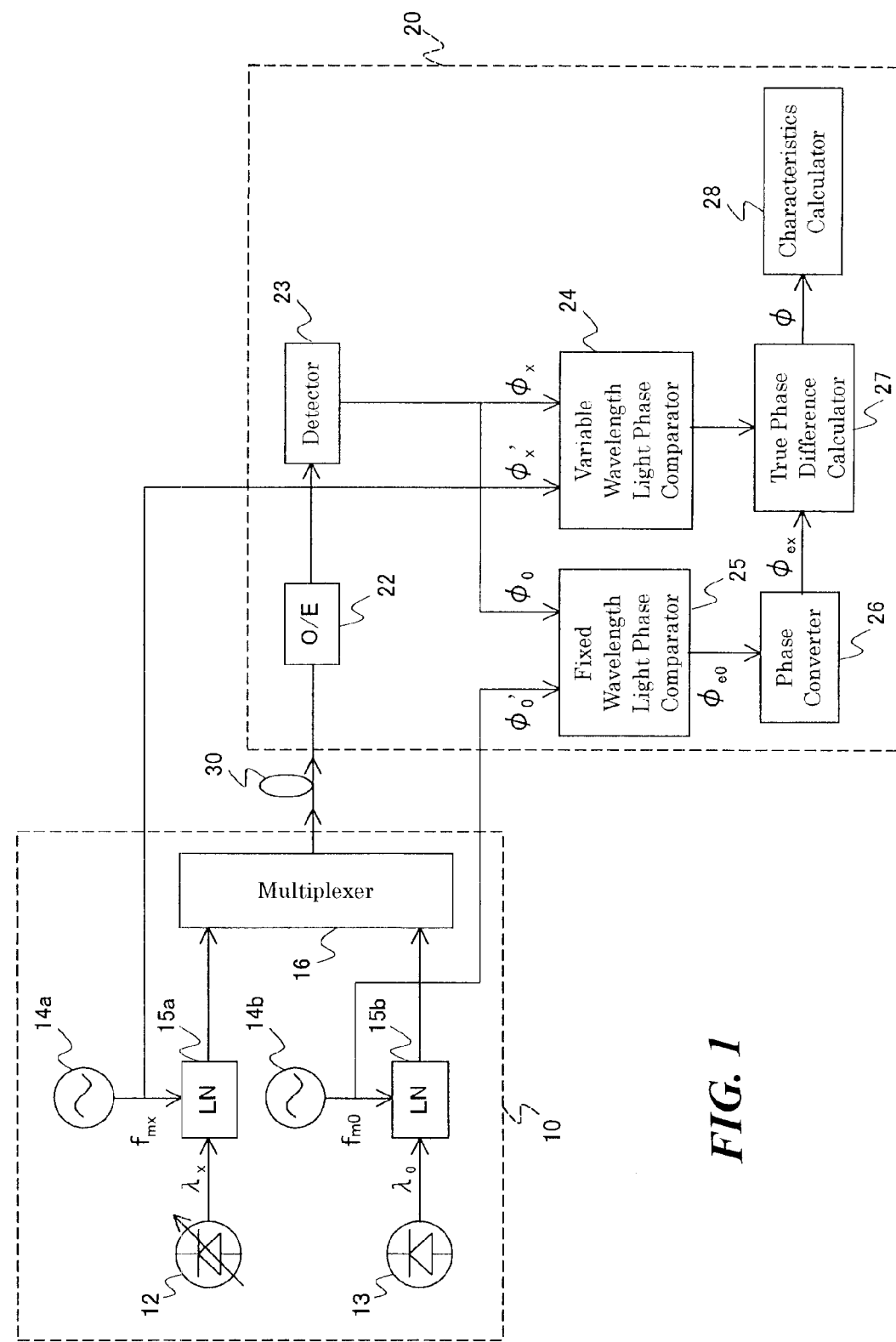
FIG. 1 is a block diagram showing a constitution of an optical characteristics measuring apparatus relating to an embodiment of the present invention.

FIG. 1 is a block diagram showing a constitution of an optical characteristics measuring apparatus relating to an embodiment of the present invention. The optical characteristics measuring apparatus relating to the embodiment of the present invention includes a light source system 10 connected with one end of a DUT 30, and a characteristics measuring system 20 connected with the other end of DUT 30. The DUT 30 is what transmits light such as an optical fiber.

The light source system 10 is provided with a variable wavelength light source 12, a fixed wavelength light source 13, power supplies for modulating 14a and 14b, optical modulators 15a and 15b, and a multiplexer 16. The variable wavelength light source 12 generates variable wavelength light whose wavelength changes. The variable wavelength light source 12 sweeps the wavelength λx of variable wavelength light. The fixed wavelength light source 13 generates fixed wavelength light whose wavelength is fixed. It is desirable that the wavelength of fixed wavelength light is fixed to the wavelength λ0, which provides the minimum chromatic dispersion in DUT 30. The power supply for modulating 14a generates an electrical signal having a first frequency of fmx. The power supply for modulating 14b generates an electrical signal having a second frequency of fm0. The optical modulator 15a modulates the variable wavelength light with the first frequency fmx. The optical modulator 15a receives the electrical signal generated by the power supply for modulating 14a to obtain the first frequency fmx. The optical modulator 15b modulates the fixed wavelength light with the second frequency fm0. The optical modulator 15b receives the electrical signal generated by the power supply for modulating 14b to obtain the second frequency fm0. The optical modulators 15a and 15b include lithium niobate (LN). As long as they can modulate light, they do not necessarily include LN. The multiplexer 16 composes the variable wavelength light with the fixed wavelength light to generate composite light, and enters it into the DUT 30.

The composite light provided for the DUT 30 is transmitted through the DUT 30. The light which has been transmitted through the DUT 30 is referred as transmitted light.

The characteristics measuring system 20 is provided with an optical/electrical converter 22, a detector 23, a variable wavelength light phase comparator 24, a fixed wavelength light phase comparator 25, a phase difference converter 26, a true phase difference calculator 27, and a characteristics calculator 28. A phase comparing means comprises the variable wavelength light phase comparator 24, the fixed wavelength light phase comparator 25, the phase difference converter 26, and the true phase difference calculator 27.

The optical/electrical converter 22 applies optical/electrical conversion to the transmitted light. The detector 23 extracts a variable wavelength light component modulated with the first frequency fmx, and a fixed wavelength light component modulated with the second frequency fm0 from an electrical signal obtained by applying optical/electrical conversion to the transmitted light.

The variable wavelength light phase comparator 24 measures a phase difference between a phase φx of the variable wavelength light component and a phase φx' of an electrical signal including the first frequency fmx generated by the power supply for modulating 14a. The fixed wavelength light phase comparator 25 measures a phase difference between a phase φ0 of the fixed wavelength light component and a phase φ0' of an electrical signal including the second frequency fm0 generated by the power supply for modulating 14b. The phase difference converter 26 converts the phase difference φ0–φ0' calculated by the fixed wavelength light phase comparator 25 into what corresponding to the first modulating frequency fmx. The true phase difference calculator 27 obtains a true phase difference between the variable wavelength light component having first modulating frequency fmx and the electrical signal including the first modulating frequency fmx from the phase difference φx–φx' calculated by the variable wavelength light phase comparator 24, and the converted result of phase difference converter 26. The "true phase difference" here is a phase difference when the affect of contraction/extension of DUT 30 is removed. The characteristics calculator 28 calculates the group delay or the chromatic dispersion of the device under test from the true phase difference. A group delay characteristic is obtained from a relationship between the true phase difference and the first modulating frequency fmx. The chromatic dispersion characteristic is obtained by differentiating the group delay characteristic by the wavelength.

Figure 2A:
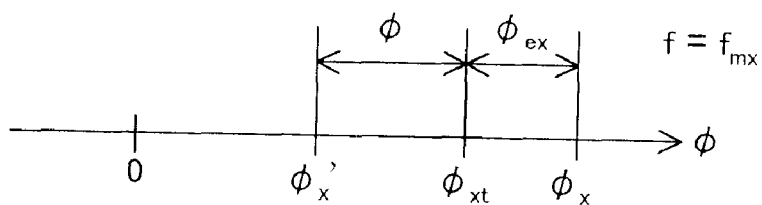
FIG. 2 is a drawing showing a principle of an operation of the embodiment of present invention.

The following section describes a principle for how the phase comparing means comprising the variable wavelength light phase comparator 24, the fixed wavelength light phase comparator 25, the phase difference converter 26, and the true phase difference calculator 27 obtains the true phase difference which excludes the affect of contraction/extension of DUT 30 while referring to FIG. 2.

The phase φx of variable wavelength light component is a sum of the phase φx' of electrical signal including the first frequency fmx generated by the power supply for modulating 14a, a phase difference φ due to the chromatic dispersion, and a phase difference φex caused by the contraction/extension of DUT 30. φxt is a phase of the variable wavelength light component when there is no affect of the contraction/extension of DUT 30. Relationship among φx, φx', φxt and the like is described in FIG. 2(a). The variable wavelength light phase comparator 24 is provided with φx and φx', and obtains φx–φx'. However, φex is not obtained. Thus, the true phase difference φ is not obtained.

Figure 2B:
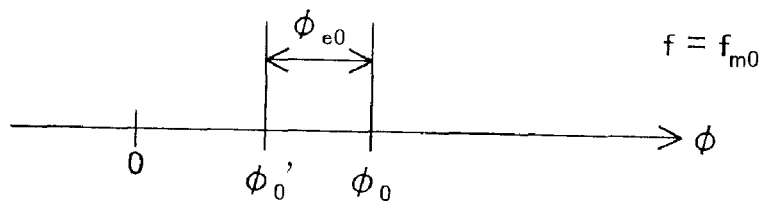

On the other hand, φe0, which is a difference between the phase φ0 of fixed wavelength light component and the phase φ0' of electrical signal having the second frequency fm0 generated by the power supply for modulating 14b is caused by the contraction/extension of DUT 30, and is not affected by the chromatic dispersion. This is because the wavelength λ0 of fixed wavelength light generated by the fixed wavelength light source 13 is fixed to a value which provides the minimum chromatic dispersion in DUT 30. FIG. 2(b) shows a relationship among φ0, φ0' and the like. The fixed wavelength light phase comparator 25 is provided with φ0 and φ0', and obtains φ0–φ0'.

Both φex and φe0 are caused by the contraction/extension of DUT 30. Thus, they have the relationship shown in the FIG. 2(c), for example. The phase difference converter 26 uses the relationship to calculate φex from φe0. It converts the phase difference φ0–φ0' calculated by the fixed wavelength light phase comparator 25 to what corresponding to the first modulating frequency fmx.

The true phase difference calculator 27 receives φx–φx' from the variable wavelength light phase comparator 24, and φex from the phase difference converter 26 to obtain the true phase difference φ.

Figure 3:
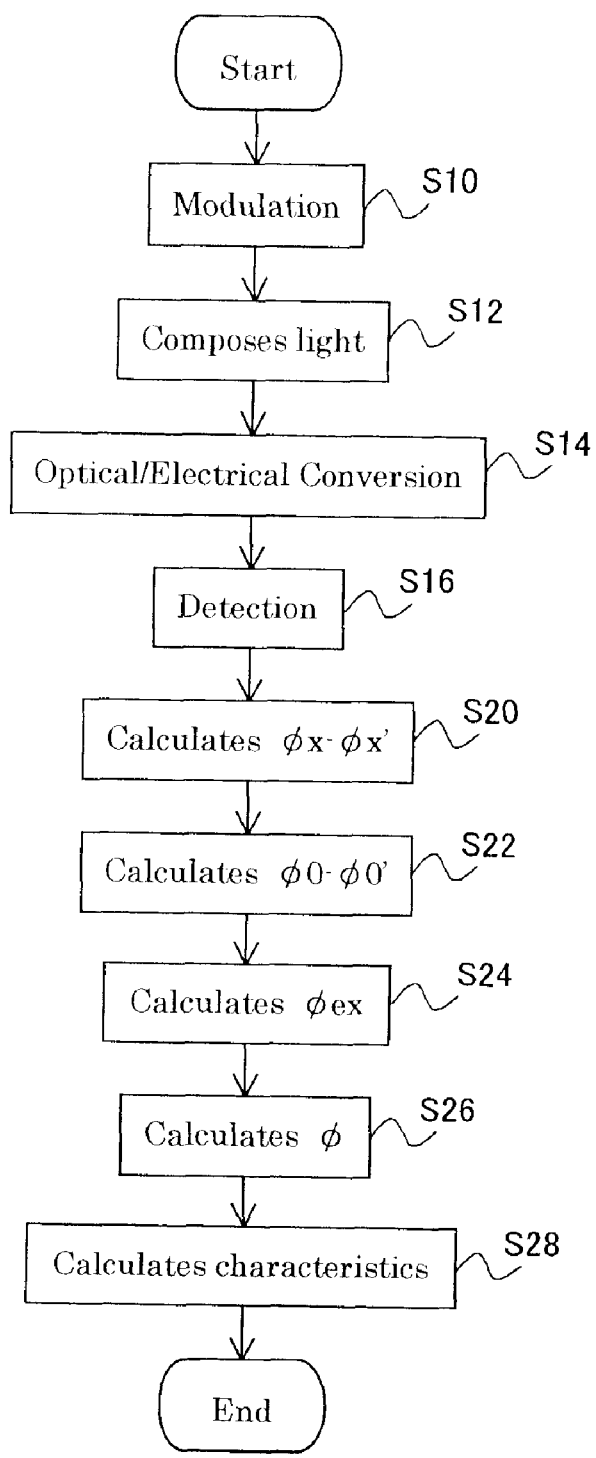
FIG. 3 is a flowchart showing an operation of the embodiment of present invention.
Figure 4:
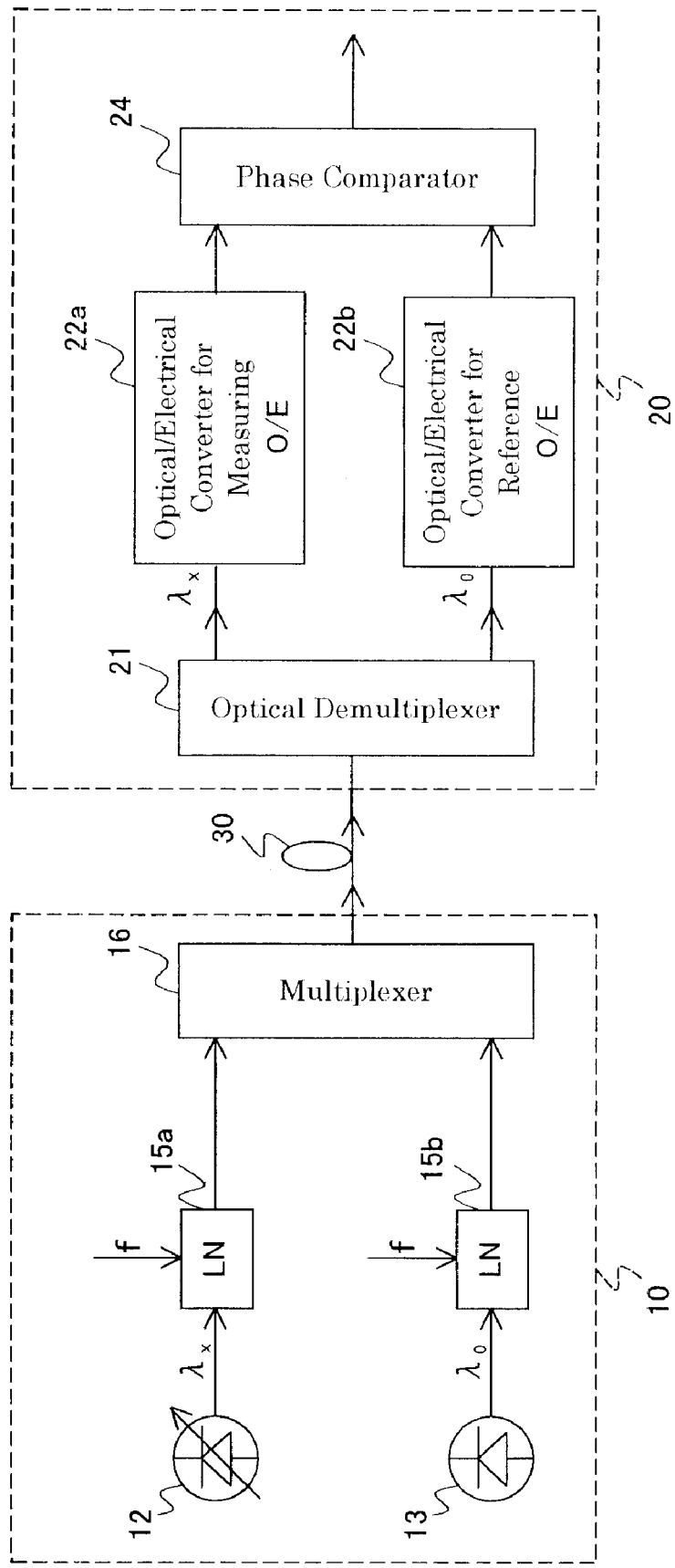
FIG. 4 is a block diagram showing a constitution of an optical characteristics measuring apparatus of prior art.

The flowchart in FIG. 3 describes the operation of embodiment of present invention. The variable wavelength light source 12 of light source system 10 changes wavelength to generate light with the wavelength of λx (variable wavelength light). The fixed wavelength light source 13 fixes wavelength to generate light with the wavelength of λ0 (fixed wavelength light). The λ0 is a wavelength which provides the minimum chromatic dispersion in DUT 30. The variable wavelength light is modulated by the optical modulator 15a with the first frequency fmx, and the fixed wavelength light is modulated by the optical modulator 15b with the frequency fm0 (S10), and they are composed by the multiplexer 16 (S12). The power supply for modulating 14a provides the optical modulator 15a with the first frequency fmx. The power supply for modulating 14b provides the optical modulator 15b with the second frequency fm0.

The light composed by the multiplexer 16 is provided for the DUT 30. The light transmitted through the DUT 30 is provided for the optical/electrical converter 22 of characteristics measuring system 20. The optical/electrical converter 22 applies optical/electrical conversion to the transmitted light to provide for the detector 23 (S14). The detector 23 extracts the variable wavelength light component and the fixed wavelength light component from the transmitted light which is applied with the optical/electrical conversion (S16). The variable wavelength light component is provided for the variable wavelength light phase comparator 24. The fixed wavelength light component is provided for the fixed wavelength light phase comparator 25. The electrical signal generated by the power supply for modulating 14a is provided for the variable wavelength light phase comparator 24. The electrical signal generated by the power supply for modulating 14b is provided for the fixed wavelength light phase comparator 25.

The variable wavelength light phase comparator 24 obtains the phase difference between the phase φx of variable wavelength light component and the phase φx' of electrical signal including the first frequency fmx generated by the power supply for modulating 14a (S20). Then, the fixed wavelength light phase comparator 25 obtains the phase difference between the phase φ0 of fixed wavelength light component and the phase φ0' of electrical signal including the second frequency fm0 generated by the power supply for modulating 14b (S22). The fixed wavelength light phase comparator 25 provides the phase difference converter 26 with φ0–φx', that is φe0. The phase difference converter 26 calculates φex from φe0 (S24). The true phase difference calculator 27 receives φx–φx' from the variable wavelength light phase comparator 24, receives φex from the phase difference converter 26, and obtains the true phase difference φ (S26). Finally, the characteristics calculator 28 uses the true phase difference φ to obtain the group delay or the chromatic dispersion of DUT 30 (S28).

With the embodiment of present invention, it is possible to obtain the group delay or the chromatic dispersion of DUT 30 by removing the affect of contraction/extension of DUT 30 and the like when the first modulating frequency fmx and the second modulating frequency fm0 are different from each other.

The embodiment described above is also realized as follows. A computer provided with a CPU, a hard disk, and a medium reading apparatus (such as a floppy disk and a CD-ROM) reads a medium storing a program for realizing the individual parts described above in the medium reading apparatus, and installs the program on the hard disk. This method also realizes the function described above.

With the present invention, it is possible to obtain characteristics of a device under test by removing an affect of contraction/extension of the device under test when the first modulating frequency and the second modulating frequency are different from each other.

What is claimed is:

1. An optical characteristics measuring apparatus for measuring characteristics of light transmitted thorough a device under test comprising:

a variable wavelength light source for generating variable wavelength light;

a fixed wavelength light source for generating fixed wavelength light;

a variable wavelength light modulating means for receiving a signal having a first modulating frequency, and modulating said variable wavelength light with said first modulating frequency;

a fixed wavelength light modulating means for receiving a signal having a second modulating frequency, which is different from said first modulating frequency, and modulating said fixed wavelength light with said second modulating frequency;

a composite light generating means for entering composite light composed of said variable wavelength light and said fixed wavelength light into said device under test;

a wavelength component extracting means for extracting a fixed wavelength light component and a variable wavelength light component from transmitted light transmitted from said device under test; and a phase comparing means for measuring a true phase difference between said variable wavelength light component having the first modulating frequency and said signal having the first modulating frequency based on said variable wavelength light component, said fixed wavelength light component, said signal having the first modulating frequency, and said signal having the second modulating frequency;

wherein characteristics of said device under test is obtained from said true phase difference.

2. The optical characteristics measuring apparatus as claimed in claim 1, wherein said phase comparing means is provided with:

a variable wavelength light phase comparing means for obtaining a phase difference between said variable wavelength light component and said signal having the first modulating frequency;

a fixed wavelength light phase comparing means for obtaining a phase difference between said fixed wavelength light component and said signal having the second modulating frequency;

a phase difference converting means for converting the phase difference calculated by said fixed wavelength light phase comparing means to what corresponding to said first modulating frequency; and a true phase difference calculating means for calculating a true phase difference from the phase difference calculated by said variable wavelength light phase comparing means and the converted result of said phase difference converting means.

3. The optical characteristics measuring apparatus as claimed in claim 1 further comprising a characteristics calculating means for calculating group delay or chromatic dispersion of said device under test from said true phase difference.

4. An optical characteristics measuring method for measuring characteristics of light transmitted thorough a device under test comprising:

a variable wavelength light generating step for generating variable wavelength light;

a fixed wavelength light generating step for generating fixed wavelength light;

a variable wavelength light modulating step for receiving a signal having a first modulating frequency, and modulating said variable wavelength light with said first modulating frequency;

a fixed wavelength light modulating step for receiving a signal having a second modulating frequency, which is different from said first modulating frequency, and modulating said fixed wavelength light with said second modulating frequency;

a composite light generating step for entering composite light composed of said variable wavelength light and said fixed wavelength light into said device under test;

a wavelength component extracting step for extracting a fixed wavelength light component and a variable wavelength light component from transmitted light transmitted from said device under test; and a phase comparing step for measuring a true phase difference between said variable wavelength light component having the first modulating frequency and said signal having the first modulating frequency based on said variable wavelength light component, said fixed wavelength light component, said signal having the first modulating frequency, and said signal having the second modulating frequency;

wherein characteristics of said device under test is obtained from said true phase difference.

5. A computer-readable medium having a program of instructions for execution by the computer to perform an optical characteristics measuring process for measuring characteristics of light transmitted thorough a device under test, said optical characteristics measuring process comprising:

a variable wavelength light generating processing for generating variable wavelength light;

a fixed wavelength light generating processing for generating fixed wavelength light;

a variable wavelength light modulating processing for receiving a signal having a first modulating frequency, and modulating said variable wavelength light with said first modulating frequency;

a fixed wavelength light modulating processing for receiving a signal having a second modulating frequency, which is different from said first modulating frequency, and modulating said fixed wavelength light with said second modulating frequency;

a composite light generating processing for entering composite light composed of said variable wavelength light and said fixed wavelength light into said device under test;

a wavelength component extracting processing for extracting a fixed wavelength light component and a variable wavelength light component from transmitted light transmitted from said device under test; and a phase comparing processing for measuring a true phase difference between said variable wavelength light component having the first modulating frequency and said signal having the first modulating frequency based on said variable wavelength light component, said fixed wavelength light component, said signal having the first modulating frequency, and said signal having the second modulating frequency;

wherein characteristics of said device under test is obtained from said true phase difference.

* * * * *